United States Patent [19]
Auld et al.

[11] Patent Number: 4,605,575
[45] Date of Patent: Aug. 12, 1986

[54] DECORATIVE EMBLEMS

[75] Inventors: David L. Auld; Robert E. Waugh, both of Columbus, Ohio

[73] Assignee: The D. L. Auld Company, Columbus, Ohio

[21] Appl. No.: 727,364

[22] Filed: Apr. 25, 1985

Related U.S. Application Data

[63] Continuation of Ser. No. 158,957, Jun. 12, 1980, abandoned, which is a continuation of Ser. No. 968,280, Dec. 11, 1978, abandoned.

[51] Int. Cl.$^4$ .................. A47G 35/00; A60R 13/04
[52] U.S. Cl. ........................... 428/14; 428/79; 428/164; 428/542.2; 428/542.6; 428/913.3; 428/31
[58] Field of Search ............ 428/13, 14, 16, 79, 428/164, 542.2, 542.6, 913.3; 29/527.4; 425/126 R, 129 R; 264/1.9, 132, 129, 135, 134, DIG. 55, DIG. 64

[56] References Cited

U.S. PATENT DOCUMENTS

| | | | |
|---|---|---|---|
| 2,134,737 | 11/1938 | Riedel | 428/79 |
| 2,704,211 | 3/1955 | Decepoli | 428/13 |
| 4,100,010 | 7/1978 | Waugh | 156/242 |

*Primary Examiner*—John E. Kittle
*Assistant Examiner*—Thomas C. Saitta
*Attorney, Agent, or Firm*—Killworth, Gottman, Hagan & Schaeff

[57] ABSTRACT

A decorative emblem is formed by producing a decorative surface, which may be printed and embossed, on a foil substrate. An integral bezel is then formed around the periphery of the decorative surface. Fluent plastic is cast onto the decorative surface to form a meniscus over it. Upon curing, the plastic cap gives a lens effect to the decorative surface. The decorative emblem may be adapted with several types of different attachment means, such as an edge adhesive strip, for fastening it to the intended surface such as an automobile, appliance, or other object.

4 Claims, 4 Drawing Figures

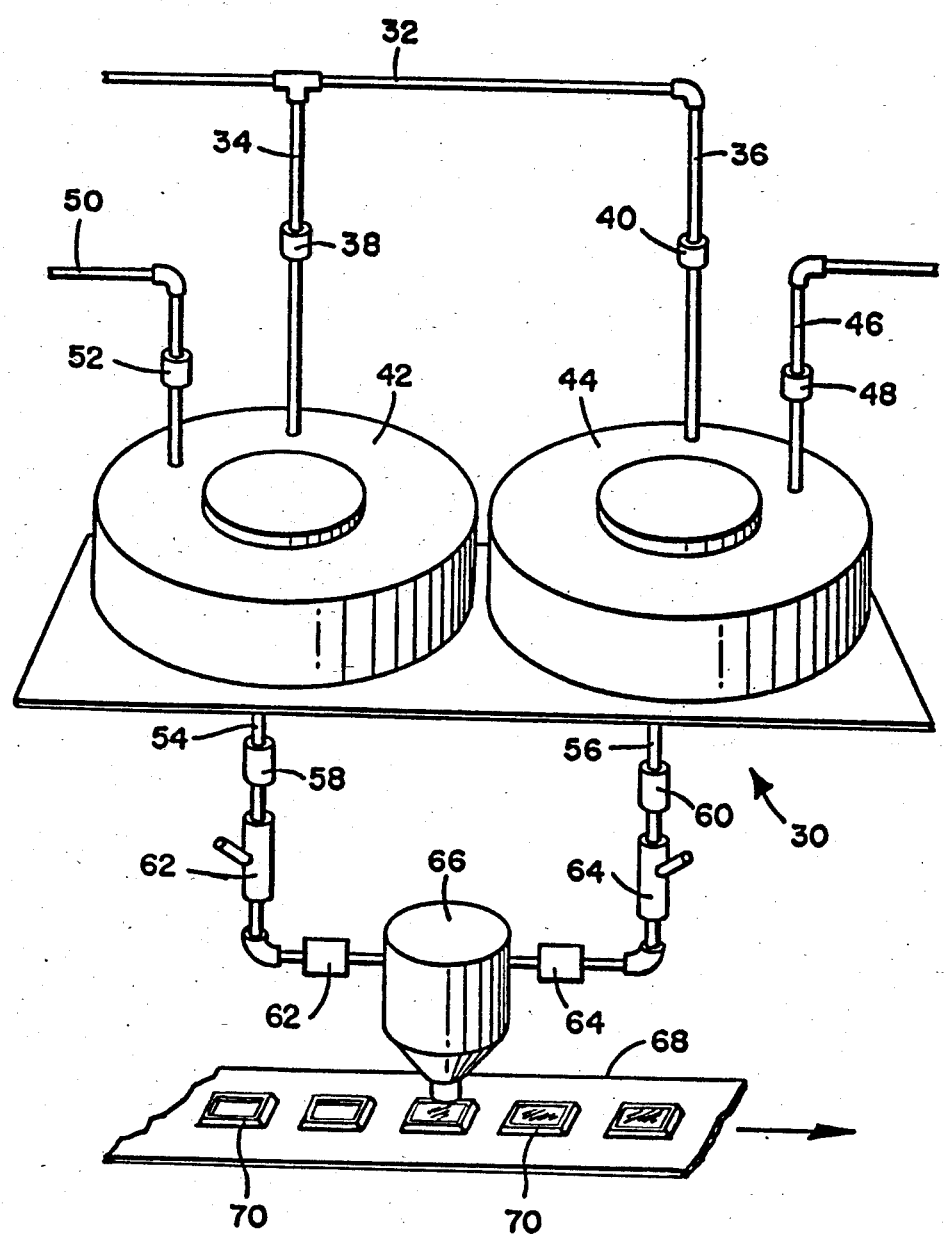

DECORATIVE EMBLEMS

CROSS-REFERENCE TO RELATED APPLICATIONS

This application is a continuation of application Ser. No. 158,957, filed June 12, 1980, now abandoned, as a continuation of application Ser. No. 968,280, filed Dec. 11, 1978, now abandoned. Reference is also made to application Ser. No. 158,956 (now U.S. Pat. No. 4,332,074), filed June 12, 1980, as a divisional of application Ser. No. 968,280, filed Dec. 11, 1978 now abandoned. Cross-reference is hereby made to related application Ser. No. 903,829, filed May 8, 1978 abandoned.

BACKGROUND OF THE INVENTION

The present invention relates to decorative emblems and plaques which have a cured plastic layer deposited onto a decorative surface having an integral bezel and a method for making the same.

Decorative plaques and emblems are widely used throughout a number of industries, including the automotive and appliance fields. In the past, a colored vitreous frit was flowed into a bronze substrate and fired at 1250° F. The glass-like vitreous enamel served to beautify the product and protect the decorative substrate from weathering should the plaque or emblem be exposed to the environment.

Today, plastics are primarily used for producing such plaques and emblems. For example, the assignee of the present invention has since 1966 produced an emblem having a molded or cast body into which plastic is deposited. A description of such products can be found in a July-August, 1972, duPont Magazine article.

Likewise, in Loew (U.S. Pat. No. 3,654,062), there is disclosed a process for injection molding a decorative Mylar facing sheet over a vinyl plastic body. The plaque is coated with a layer of protective varnish on the outer surface of the facing sheet. Gits, U.S. Pat. No. 3,246,066, is similar in that male and female molds are used to form a cavity into which a decorative foil is placed and into which a clear plastic material is injected. Prior to injecting a clear plastic material against the front face of the foil, the foil is precoated. Other molding processes, such as compression molding (either one or two shot), are also well known in the art. See for instance, U.S. Pat. Nos. 2,244,565; 2,931,119; 3,075,249; and 3,114,597.

In U.S. Pat. No. 4,100,010, assigned to the same assignee, there is disclosed an improved process for producing decorative emblems. That process involves casting a plastic material onto decorative foil shapes to form a meniscus which when cured gives a lens effect to the top surface of the foil shape. A problem with that process is that the then capped substrate does not usually make up a complete decorative emblem. Normally, the capped substrate will be used as an insert to be placed inside a decorative bezel, which is most commonly a highly polished die casting, or plastic or plated plastic or some other decorative substance.

In such a process, it is thus necessary to decorate the substrate, emboss the decorated substrate, if desired, apply a pressure-sensitive adhesive to the back of the substrate, cast the plastic material onto the top surface of the substrate, and then insert that capped decorated substrate into a separately manufactured decorated bezel. As can be seen, this involves a large number of process steps, many requiring the work of skilled craftsmen.

Accordingly, the need exists for a more efficient method of forming an improved emblem which does not require separate bezel and insert formation.

SUMMARY OF THE INVENTION

The present invention meets that need by utilizing a decorative surface having an integral bezel formed peripherally around it. That is, a decorated sheet such as metal (i.e., aluminum) foil, laminated metal foil, or metalized plastic foil is formed with a peripheral bezel having an appearance similar to the bezel within which an emblem insert would normally be placed. The integral bezel and decorative surface thus formed, a fluent plastic material is cast onto the decorative surface to form a meniscus which is contiguous with the peripheral bezel. The cast plastic, when cured, gives a lens effect to the decorative surface beneath it.

The decorative surface can be prepared by a number of means. Preferably, the design is applied by silk screen or lithographic printing. It is often desirable to prime the top surface of the substrate prior to printing. Any suitable primer may be used, such as a silane primer.

It is also desirable to enhance the design of the decorative surface by embossing. Actually, the embossing may be done during the same forming step used to produce the integral bezel. Since the bezel is contiguous to the decorative surface and exists around the periphery thereof, it is a simple matter to form the peripheral bezel and emboss the central decorative surface in a single stamping operation.

It is preferred that such forming features take place on a thin guage foil. As such, it is desirable to wrap the formed foil around a backing plate. The backing plate may be, for example, made of injection-molded plastic.

The attachment means may then be a part of or connected to the backing plate. It has been found that an edge adhesive strip gives a better adhesion and moisture seal of the emblem of the present invention, particularly when that emblem is applied to an uneven surface. The edge adhesive strip may be a double-sided pressure-sensitive adhesive tape or a bead of pressure sensitive adhesive which is applied into a peripheral groove formed in the backing plate.

An alternative is to use an overall adhesive coating on the back of the emblem or tabs, pins, etc. may be used. The tabs or connecting pins may be formed in or attached to the backing plate for the foil emblem. It is also possible to do without the backing plate by forming tabs into the edge of the foil. When applied to a substrate these tabs may, then, be inserted into a receiving slot and bent to complete the attachment as is a common practice. At any rate, there is provided a means for attachment of the emblem onto the ultimately desired surface whether it be an automobile, appliance, or other object.

As is the case with the prior emblems of the assignee of the present invention, the end result is a decorative emblem of unique beauty which is resistant to the environment of its intended use. Basically, this is because the preferred fluent plastic cast onto the decorative surface has the property of hardness without brittleness and withstands heavy abuse from strong detergents and from impact. It can withstand rigid water and humidity tests, salt and acid tests, hot and cold temperature tests, and gas tests.

The plastic is preferably a fluent polyurethane of two component parts (polyol and isocyanate) which are mixed immediately prior to coating and cure upon heating. A polyurethane of this type is disclosed in U.S. Pat. No. 4,100,010. In formulating the particular plastic composition from among those disclosed in U.S. Pat. No. 4,100,010, it is helpful to use a catalyst which results in a somewhat slow curing time in order to allow the liquid plastic to flow to its full extent, i.e., to completely cover the decorative surface and stop at the peripheral bezel before curing is accomplished.

Likewise, the polyurethane may be compounded from among the components listed in U.S. Pat. No. 4,100,010 as is known to give a more flexible cured plastic. For most of the types of plastic contemplated, curing will be by irradiation with infrared or ultraviolet light. The polyurethane compounds mentioned above are heat curable and, thus, infrared lamps are used; although, obviously other heat sources may also be used.

In this way, there is produced an emblem that has been formed essentially from a single piece of substrate material, which has the same general appearance of emblems previously produced by inserting a plastic capped decorative substrate into a separate bezel. The economy of the present invention over the prior art should be apparent.

Accordingly, it is an object of the present invention to provide decorative emblems which have a decorative surface and an integral bezel, and a method for making the same.

Another object of the present invention is to provide decorative emblems which also have an edge adhesive strip thereon in order to facilitate easy application to the intended surface.

Other objects and advantages of the present invention will be apparent from the following description, the accompanying drawings and the appended claims.

BRIEF DESCRIPTION OF THE DRAWINGS

FIG. 4 is a perspective view of the casting system for depositing the fluent plastic capping material onto the decorative surface of the emblem.

DESCRIPTION OF THE PREFERRED EMBODIMENTS

Figure 1:
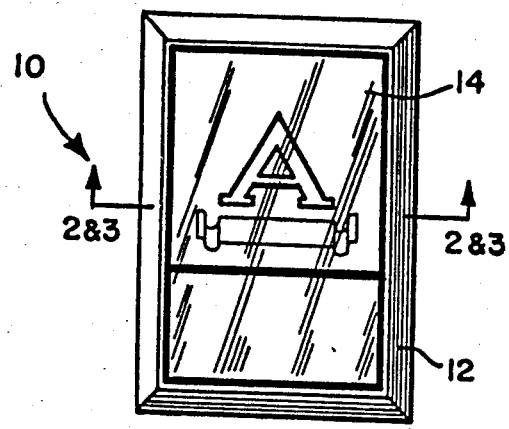
FIG. 1 is a front view of the emblem of the present invention having a decorative surface and an integral bezel.

Referring to FIG. 1, there is shown an emblem 10 of the present invention. An emblem of the type shown may be considered by some to be a plaque rather than an emblem, but for the purpose of this discussion, no distinction will be made. It should be apparent that either emblems or plaques or even panels may be made in the same manner disclosed herein. Accordingly, the term emblem will be used to cover all such items.

Emblem 10 has a peripheral bezel 12 and a centrally located decorative surface 14. The integral bezel is better shown in the cross-sectional representation of FIGS. 2-3, which illustrate two embodiments of the emblem of the present invention.

Figure 2:
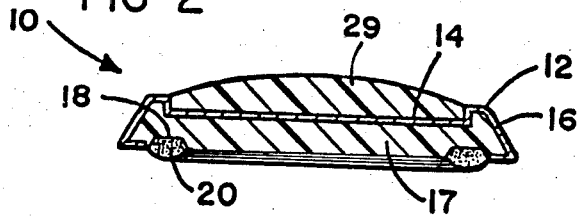
FIG. 2 is a cross-sectional view of one embodiment of the emblem of the present invention.

In FIG. 2, bezel 12 is shown formed in a thin guage metal foil 16, which is wrapped around a backing plate 17 having grooves 18 formed therein. That figure also shows a pressure-sensitive adhesive bead 20 located in grooves 18. As mentioned previously, the edge adhesive strip may also be a two-sided pressure-sensitive adhesive tape which is fitted into grooves 18. In each case, a release liner (not shown) such as a silicone or fluorocarbon treated paper will cover the edge adhesive strip until it is removed prior to application of the emblem to the intended surface.

Figure 3:
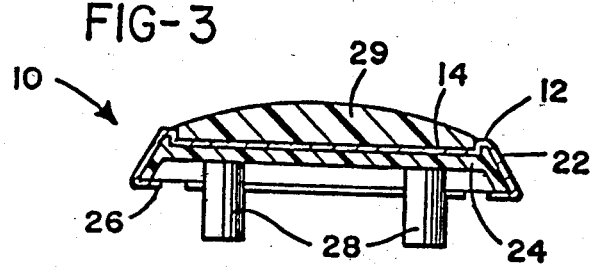
FIG. 3 is a cross-sectional view of another embodiment of the emblem of the present invention.

An alternative embodiment is shown in FIG. 3. There a thin guage metal substrate 22 is formed with an integral bezel 12 in the same manner. That forming may be by standard die stamping techniques and may include the aspect of embossing decorative surface 14 at the same time. The embossing can also take place in a separate operation, if so desired.

The formed substrate of FIG. 3 is attached to backing plate 24 as in FIG. 2. The attachment may be by physical means such as bending lips 26 around backing plate 24 or by other means, such as adhesive. Backing plate 24 may be an injection molded rigid plastic having connecting pins 28 extending therefrom. Connecting pins 28 are pressure fitted into holes drilled into the surface onto which the emblem is to be displayed. This is an example of another type of means of attaching the finished emblem to the intended object. Of course, others may also be used.

Before the emblem is completed, however, plastic lens cap 29 is deposited over decorative surface 14. This may be done either before or after the backing plate of FIGS. 2 and 3 is attached to the foil substrate. Lens cap 29 is shown in FIGS. 2 and 3. As shown, it takes the form of a meniscus which is contiguous with the peripheral bezel 12 and completely covers decorative surface 14. An appropriate amount of fluent plastic is deposited onto decorative surface 14 and allowed to flow to the peripheral bezel 12 and form the meniscus. It is then cured, preferably by infrared or UV irradiation.

The preferred system for doing this is shown in FIG. 4. The casting apparatus is designated generally 30. A vacuum line 32 is connected via lines 34 and 36 to storage-degassing tanks 42 and 44, respectively. A pair of ball valves 38 and 40 are inserted in lines 34 and 36 to insure against any air going back into the tanks. Supply lines 50 and 46, having ball valves 52 and 48 therein, supply component Part A and Part B to tanks 42 and 44, respectively. Parts A and B are preferably portions of a two-component polyurethane plastic.

This may be a mixture of "A" and "B" components of the type disclosed in U.S. Pat. No. 4,100,010. Basically, that mixture is one of a polyether polyol component ("A"), which may be a difunctional, trifunctional and/or tetrafunctional polypropylene glycol containing a suitable catalyst, and a diisocyanate component ("B") such as an aliphatic diisocyanate. A catalyst such as a lead material is used since it promotes a slow cure at room temperature so as to allow time for full flow of the liquid polyurethane before setting. As stated in U.S. Pat. No. 4,100,010, which is specifically incorporated herein by reference, an example of the diisocyanate is Hylene W from E. I. duPont de Nemours and Co., and the polyether polyol may be one or more of the Pluracol materials (P-410 or TP-440) from BASF Wyandotte. It may also be a polyether-polyester polyol combination, use of the polyester polyol making the cured polyurethane more flexible. The ratio of components A:B is preferably 50-60:40-50. A polyester polyol or polylactone polyol could be used in place of the polyether polyol.

The mixture of "A" and "B" components of this type cures, through catalytic action, under heat such as produced by infrared radiation. Accordingly, this type of arrangement will be disclosed as the preferred embodiment; although, single component, photocurable, polyurethanes of known types could also be used.

The "A" and "B" materials can be stirred in tanks 42 and 44 of FIG. 4 for the purpose of degassing. The degassed material then flows down pipes 54, 56 through ball valves 58, 60 through filters 62, 64 through metering devices 62' and 64' and into mixing and casting head 66 which is of a standard design.

Located beneath the casting head is a moving conveyer 68 with which the casting head 66 is timed. The conveyor carries the formed foil substrates to be cast, such as 70. When a substrate comes under the casting head, the belt stops. A predetermined amount of the plastic material is cast and then the conveyor moves the next substrate into position. The cast substrates are moved forward into baking areas containing infrared lamps. The substrates are then cooled and unloaded.

In this way, there is produced a decorative emblem which has all of the features of the emblems of the past, but is easier to produce because of the integral bezel formed in the foil substrate. As a result, a number of otherwise costly manufacturing steps can be eliminated. This provides significant advantages in an industry such as the one described.

While the article and method herein described constitute a preferred embodiment of the invention, it is to be understood that the invention is not limited to this precise article and method, and that changes may be made therein without departing from the scope of the invention.

What is claimed is:

1. A complete, capped decorative emblem for attachment to an intended surface such as an automobile or appliance comprising a lens cap formed on a shaped foil substrate by the steps of:
 (a) printing a decorative design on the upper surface of a foil substrate;
 (b) forming said foil substrate into an emblem shape with an integral bezel peripherally around said decorative design;
 (c) casting a fluent plastic material directly onto said upper surface of said foil so that it completely cover said decorative design and forms a meniscus-shaped lens cap within said peripheral bezel; and
 (d) curing said fluent plastic so that it gives a lens effect to said decorative design beneath it.

2. The decorative emblem of claim 1 wherein said upper surface of said foil substrate is embossed prior to casting said fluent plastic thereon.

3. The decorative emblem of claim 1 wherein the side of said foil substrate opposite said upper surface is attached to a backing plate.

4. The decorative emblem of claim 3 wherein said backing plate has peripheral grooves located opposite said peripheral bezel, and wherein an edge adhesive strip is located in said grooves.

* * * * *